US012514821B2

(12) United States Patent
Xu et al.

(10) Patent No.: US 12,514,821 B2
(45) Date of Patent: Jan. 6, 2026

(54) PHARMACEUTICAL TACI-Fc FUSION PROTEIN FORMULATION

(71) Applicant: Remegen Co., Ltd., Shandong (CN)

(72) Inventors: Qiaoyu Xu, Shandong (CN); Zhuanglin Li, Shandong (CN); Xuejing Yao, Shandong (CN); Jianmin Fang, Shandong (CN)

(73) Assignee: RemeGen Co., Ltd., Shandong (CN)

( * ) Notice: Subject to any disclaimer, the term of this patent is extended or adjusted under 35 U.S.C. 154(b) by 1022 days.

(21) Appl. No.: 17/310,431

(22) PCT Filed: Dec. 9, 2020

(86) PCT No.: PCT/CN2020/134872
§ 371 (c)(1),
(2) Date: Aug. 2, 2021

(87) PCT Pub. No.: WO2021/115321
PCT Pub. Date: Jun. 17, 2021

(65) Prior Publication Data
US 2022/0133633 A1 May 5, 2022

(30) Foreign Application Priority Data
Dec. 10, 2019 (CN) .......................... 201911261372.9

(51) Int. Cl.
| A61K 47/18 | (2017.01) |
| A61K 9/19 | (2006.01) |
| A61K 38/00 | (2006.01) |
| A61K 47/26 | (2006.01) |
| C07K 14/47 | (2006.01) |
| C07K 19/00 | (2006.01) |

(52) U.S. Cl.
CPC .............. *A61K 9/19* (2013.01); *A61K 47/183* (2013.01); *A61K 47/26* (2013.01); *C07K 14/4705* (2013.01); *C07K 19/00* (2013.01); *A61K 38/00* (2013.01)

(58) Field of Classification Search
CPC ..... C07K 19/00; C07K 14/4705; A61K 38/00
See application file for complete search history.

(56) References Cited

U.S. PATENT DOCUMENTS

| 8,637,021 | B2 * | 1/2014 | Del Rio | ................ | A61K 47/26 |
| | | | | | 424/134.1 |
| 2009/0258017 | A1 | 10/2009 | Callahan et al. | | |
| 2010/0136008 | A1 | 6/2010 | Fang et al. | | |
| 2010/0297122 | A1 * | 11/2010 | Del Rio | ................ | A61P 37/00 |
| | | | | | 424/134.1 |
| 2012/0121580 | A1 | 5/2012 | Bhambhani et al. | | |
| 2016/0375133 | A1 | 12/2016 | Bhambhani et al. | | |
| 2021/0087253 | A1 | 3/2021 | Fang et al. | | |

FOREIGN PATENT DOCUMENTS

| AU | 2008322930 B2 | 5/2009 | |
| CN | 101323643 A | 12/2008 | |
| CN | 101323643 B | * 12/2010 | ................ A61P 1/00 |
| CN | 102085367 A | 6/2011 | |
| CN | 102085368 A | 6/2011 | |
| CN | 104740609 A | 7/2015 | |
| CN | 105168123 A | 12/2015 | |
| CN | 108671229 A | 10/2018 | |
| CN | 110522908 A | 12/2019 | |
| EP | 2 018 183 B1 | 9/2016 | |
| JP | 2010-529967 A | 9/2010 | |
| JP | 2011-503038 A | 1/2011 | |
| RU | 2433141 C2 | 11/2011 | |
| WO | WO-2008154814 A1 | * 12/2008 | .............. A61P 35/00 |
| WO | WO 2011/017070 A1 | 2/2011 | |
| WO | WO 2017/078385 A1 | 5/2017 | |
| WO | WO 2019/223581 A1 | 11/2019 | |

OTHER PUBLICATIONS

Kunihiko Gekko, Mechanism of Polyol-Induced Protein Stabilization: Solubility of Amino Acids and Diglycine in Aqueous Polyol Solutions, The Journal of Biochemistry, vol. 90, Issue 6, Oct. 1981, pp. 1633-1641, https://doi.org/10.1093/oxfordjournals.jbchem.a133638 (Year: 1981).*

V. Gervasi et al.Parenteral protein formulations: An overview of approved products within the European Union, European Journal of Pharmaceutics and Biopharmaceutics, vol. 131,2018,pp. 8-24, (Year: 2018).*

Koichi Hayashi, Tadaaki Matsuda, Toru Takeyama, Tetsuo Hino, Solubilities Studies of Basic Amino Acids, Agricultural and Biological Chemistry, vol. 30, Issue 4, Apr. 1, 1966, pp. 378-384, https://doi.org/10.1080/00021369.1966.10858601 (Year: 1966).*

J.C. Lee, S.N. Timasheff, The stabilization of proteins by sucrose., Journal of Biological Chemistry, vol. 256, Issue 14, (Year: 1981).*

Bloom, J.W., Madanat, M.S., Marriott, D., Wong, T. and Chan, S.-Y. (1997), Intrachain disulfide bond in the core hinge region of human IgG4. Protein Science, 6: 407-415. https://doi.org/10.1002/pro.5560060217 (Year: 1997).*

Singh, S., Singh, J. Effect of polyols on the conformational stability and biological activity of a model protein lysozyme. AAPS PharmSciTech 4, 42 (2003). https://doi.org/10.1208/pt040342 (Year: 2003).*

Bloom, James W., et al. "Intrachain disulfide bond in the core hinge region of human IgG4." Protein Science 6.2 (1997): 407-415. (Year: 1997).*

(Continued)

*Primary Examiner* — Jeanette M Lieb
*Assistant Examiner* — David Paul Bowles
(74) *Attorney, Agent, or Firm* — COOLEY LLP; Andrew T. Wilkins; Sharla F. Flohr

(57) ABSTRACT

Disclosed is a pharmaceutical formulation containing a mixture of a non-reducing sugar, a TACI-Fc fusion protein and at least one amino acid. The pharmaceutical formulation has the characteristics of reducing particulate matter, reducing aggregate formation, improving the stability, improving the appearance of a freeze-dried powder, etc.

19 Claims, 2 Drawing Sheets
Specification includes a Sequence Listing.

(56) References Cited

OTHER PUBLICATIONS

Gervasi, Valeria, et al. "Parenteral protein formulations: an overview of approved products within the European Union." European Journal of Pharmaceutics and Biopharmaceutics 131 (2018): 8-24. (Year: 2018).*

Hayashi, Koichi, et al. "Solubilities studies of basic amino acids." Agricultural and Biological Chemistry 30.4 (1966): 378-384. (Year: 1966).*

Singh, Somnath, and Jagdish Singh. "Effect of polyols on the conformational stability and biological activity of a model protein lysozyme." Aaps Pharmscitech 4.3 (2003): 42. (Year: 2003).*

Gekko, Kunihiko. "Mechanism of polyol-induced protein stabilization: solubility of amino acids and diglycine in aqueous polyol solutions." The Journal of Biochemistry 90.6 (1981): 1633-1641. (Year: 1981).*

International Search Report in PCT/CN2020/134872 issued Mar. 10, 2021.

Cui, Y et al. 2017 "Monoclonal antibodies: formulations of marketed products and recent advances in novel delivery system" Drug Development and Industrial Pharmacy vol. 43, Issue 4 (in 40 pages).

Schmidt, S.R. 2017 "Production Challenges for Complex Biologics: Fusion Proteins" American Pharmaceutical Review-Biopharm Development, 10(1): 42-46.

Australian Examination Report No. 1 for Application No. 2020401160 dated Oct. 27, 2023.

Baynes, Brian M., et al. "Role of arginine in the stabilization of proteins against aggregation." Biochemistry 44, No. 12 (2005): 4919-4925.

European Search Report for Application No. 20899392.3 dated Nov. 14, 2023 (in 11 pages).

Johnson, Robert E. et al. "Mannitol-sucrose mixtures-versatile formulations for protein lyophilization." Journal of Pharmaceutical Sciences 91, No. 4 (2002): 914-922.

Wang, Bingquan, et al. "Impact of sucrose level on storage stability of proteins in freeze-dried solids: II. Correlation of aggregation rate with protein structure and molecular mobility." Journal of Pharmaceutical Sciences 98, No. 9 (2009): 3145-3166.

Wang, Wei, et al. "Antibody structure, instability, and formulation." Journal of Pharmaceutical sciences 96, No. 1 (2007): 1-26.

Daugherty, A. L., & Mrsny, R. J. (2006). "Formulation and delivery issues for monoclonal antibody therapeutics". Reprinted from: *Advanced drug delivery reviews*, 58(5-6), 686-706. In two parts.

Whitaker, Neal et al. (2017). "A Formulation Development Approach to Identify and Select Stable Ultra-High-Concentration Monoclonal Antibody Formulations With Reduced Viscosities". *Journal of Pharmaceutical Sciences*, vol. 106, Issue 11, 3230-3241.

Australian Government, IP Australia, Examination Report No. 2 for Standard Patent Application No. 2020401160, dated Oct. 3, 2024 (in 7 pages).

Korean Patent Office, Request for the Submission of an Opinion, Korean Application No. 10-2022-7008117, dated Sep. 19, 2024 (in 21 pages).

Russian First Office Action in Russian Application No. 2021122484 issued Mar. 24, 2022.

World Health Organization, "The Pursuit of Responsible Use of Medicines: Sharing and Learning from Country Experiences," Mar. 2012.

Stringer J.L. Drug, in Encyclopedia Britannica, 2015.

First Office Action in Canadian Counterpart Application No. 3,128,113 issued on Sep. 26, 2022.

Office Action in Japanese Counterpart Patent Application No. 2021-577193 dated Feb. 7, 2023.

Uchiyama, S. et al., "Solution properties of antibody drugs", *Pharmaceutic Science*, 2014, 74(1), pp. 12-18.

* cited by examiner

PHARMACEUTICAL TACI-Fc FUSION PROTEIN FORMULATION

FIELD

The present disclosure relates to a fusion protein pharmaceutical formulation that regulates lymphocytopoiesis and lymphocyte differentiation, and belongs to the field of anti-autoimmune disease drugs.

REFERENCE TO SEQUENCE LISTING

This application incorporates by reference the sequence listing submitted as ASCII text filed via EFS-Web on Jul. 29, 2021. The Sequence Listing is provided as a file entitled "53874328_1.txt," created on Jul. 29, 2021, and which is approximately 3.6 KB in size.

BACKGROUND

Lymphocytopoiesis and lymphocyte differentiation are regulated by cytokines. B lymphocyte stimulator (Blys, also known as B cell activating factor, BAFF) and a proliferation-inducing ligand (APRIL) are cytokines with an important regulatory effect on human immune response. They can promote the development and proliferation of B lymphocytes and increase the expression of immunoglobulin in the blood. BlyS and APRIL also have a key regulatory effect on the maturation of T lymphocytes, so they also have an important impact on cellular immunity.

Blys and APRIL regulate the immune response of lymphocytes through receptors on the surface of lymphocytes. They bind to cell membrane receptors, TACI (Transmenbrane Activator and CAML-interactor) and BCMA (B Cell Maturation Antigen). In addition, BLyS can also bind to another receptor, BAFF-R. B lymphocytes express TACI, BCMA and BAFF-R, and mature T lymphocytes express TACI. BlyS and APRIL regulate the activation, proliferation and development of lymphocytes through the signaling of these receptors, and produce an immune response. Furthermore, for lymphocyte tumors, BlyS and APRIL also have effects of promoting tumor cell division and inhibiting tumor cell apoptosis, thus accelerating the progress of tumors.

A number of studies have shown that the overexpression of BlyS and APRIL is one of the reasons for a variety of autoimmune diseases. These diseases include systemic lupus erythematosus, rheumatoid arthritis, Sjogren's syndrome and the like. Clinical studies have demonstrated that the concentration of BlyS is often positively correlated with the severity of autoimmune diseases. Therefore, inhibiting the production of BlyS and APRIL or reducing their concentration in the body becomes an effective way to treat autoimmune diseases. Meanwhile, since BlyS and APRIL can accelerate the process of B lymphocyte tumors, inhibition of BlyS and APRIL can also be used to treat B lymphocyte tumors, such as chronic lymphocytic leukemia, multiple myeloma, and B lymphocyte lymphoma.

Since TACI has a high affinity for BlyS and APRIL, soluble TACI (the extracellular part of TACI) is used to prevent the interaction between BlyS or APRIL and cell membrane receptors (TACI, BCMA and BAFF-R), so as to achieve the purpose of blocking the biological activity of BlyS and APRIL and treating autoimmune diseases or tumors. Multiple studies have shown that the fusion protein (TACI-Fc) with the extracellular part of TACI binding to IgG Fc fragment can effectively inhibit diseases related to BlyS and APRIL. For example, the clinical results of the TACI fusion protein Atacicept developed by ZymoGenetics and Merck Serono reveal that it has a therapeutic effect on SLE, rheumatoid arthritis, lymphoma and other diseases.

In addition, the patent CN101323643B discloses a fusion protein consisting of truncated TACI and immunoglobulin Fc. The TACI portion of the fusion protein comprises the amino terminal region sequence starting from amino acid residue 13 in the extracellular region of TACI, the entire cysteine-rich region, and a partial sequence of the stalk region. The immunoglobulin Fc portion of the fusion protein comprises a hinge region, CH2 region and CH3 region. The TACI sequence and the Fc sequence are fused directly or via a linker sequence. Further, the TACI portion thereof is selected from positions 13-108 or 13-118 of the amino acid sequence of TACI, the linker sequence is 9Gly, and the immunoglobulin Fc fragment is selected from human or animal immunoglobulin Fc, which is selected from IgG IgM, IgD, and IgA, with each immunoglobulin type including each subtype, such as IgG1. Patent CN102085368B discloses the aforementioned TACI-Fc fusion protein useful in the treatment of autoimmune diseases, such as systemic lupus erythematosus. Patent application CN201810512508.8 proved the use of TACI-Fc fusion protein for the treatment of neuromyelitis optica spectrum disorder (NMOSD) and multiple sclerosis (MS). The NMOSD includes neuromyelitis optica, recurrent optic neuritis, longitudinally extending transverse myelitis, optic-spinal form of multiple sclerosis, long-term transverse myelitis, unilateral or bilateral optic neuritis, optic neuritis or myelitis accompanying with autoimmune disease, optic neuritis or myelitis accompanying with symptomatic or asymptomatic intracranial lesions.

Part of the formulations of other antibody drugs and fusion proteins that have been on the market are as follows:

| Trade name | Common name | Adjuvant ingredient |
| --- | --- | --- |
| Humira | adalimumab | mannitol, polysorbate 80 |
| Taltz | ixekizumab | anhydrous citric acid, polysorbate 80, sodium chloride, sodium citrate dihydrate |
| Trulicity | dulaglutide | anhydrous citric acid, mannitol, polysorbate 80, trisodium citrate dihydrate |
| Erelzi | etanercept-szzs | citric acid, sodium citrate, sodium chloride, sucrose, lysine |
| Amevive | alefacept | citric acid monohydrate, glycine, sodium citrate, sucrose |
| Nulojix | belatacept | sodium dihydrogen phosphate, sodium chloride, sucrose |
| Tanzeum | albiglutide | mannitol, polysorbate 80, sodium phosphate, trehalose dihydrate |
| Benlysta | Belimumab | sodium chloride, L-arginine hydrochloride, L-histidine hydrochloride, L-histidine, polysorbate 80 |

It can also be seen from the compositions of the adjuvant ingredients of the above antibody preparation and fusion protein that the composition of the fusion protein and antibody preparation has its own uniqueness. On the one hand, due to the low stability and complicated structure of monoclonal antibody drugs, it is extremely challenging to manufacture and store such drugs. On account of the heterogeneous structure of antibodies, especially the complementarity determining regions (CDRs) and Fc glycosylation, the development of different monoclonal antibody formulations needs to be carried out individually based on case. In the development of antibody formulations, there are challenges in antibody conformation, colloid or chemical structure, such as oxidation, isomerization, deamidation, aggregation, denaturation and fragmentation. When exposed to different temperature, humidity, pH and stress conditions, the stereostructure of mAb may change, especially in the hypervariable regions (HVRs). Poor products may exhibit reduced activity, and more importantly, increased immunogenicity can endanger the patient. Therefore, it is of vital importance to choose the best adjuvants to protect the antibody (Reference 1: Monoclonal antibodies: formulations of marketed products and recent advances in novel delivery system, Yanan Cui et al., Drug Development and Industrial Pharmacy, Volume 43, Issue 4, Pages 519-530, 2017). On the other hand, the easy aggregation and poor stability of fusion protein products cause adverse immune responses or interfere with the purification process, which has always been a problem to be solved in this field. Moreover, the factors that affect the aggregation of fusion proteins are also complicated, which can be divided into external factors and internal factors. The external factors mainly include temperature, physical pressure and solvent factors (pH, ionic strength, concentration, metal ions, etc.); and the internal factors mainly include the structural characteristics of the fusion protein, sensitive residues and unpaired cysteine, etc. These factors will affect the aggregation of the fusion protein, thereby affecting its stability and storage time. Therefore, the selection of adjuvants for fusion proteins requires a lot of experimental exploration (Reference 2: Production Challenges for Complex Biologics: Fusion Proteins, Stefan R. Schmidt, American Pharmaceutical Review, pages 1-5, 2017).

Therefore, the purpose of the present disclosure is to obtain a formulation combination of TACI-Fc fusion protein through a wide range of screening and concentration range research on the available adjuvants for biological formulations to achieve the following technical effects: the TACI-Fc fusion protein can dissolve well before and after lyophilization, with the insoluble microparticles and visible foreign matters meeting the standards of injection for human use, and yet remain stable for a long time during the lyophilization and storage process, which is not prone to polymerization or degradation after redissolution, maintaining a good biological activity.

SUMMARY

The present disclosure relates to an aqueous liquid pharmaceutical formulation of TACI-Fc fusion protein, comprising the TACI-Fc fusion protein, a non-reducing sugar, and an amino acid; wherein the non-reducing sugar is selected from mannitol, sucrose, trehalose and a combination thereof; and the amino acid is selected from histidine, alanine, arginine, glycine, glutamic acid and a combination thereof.

In some embodiments, wherein the histidine is histidine hydrochloride at a concentration of 1-100 mmol/L, preferably 5-50 mmol/L, 5-20 mmol/L, 8-12 mmol/L, or about 10 mmol/L; and the arginine is arginine hydrochloride at a concentration of 10-160 mmol/L, preferably 20-120 mmol/L, 50-100 mmol/L, 70-95 mmol/L, 75-90 mmol/L, or about 90 mmol/L, or about 75 mmol/L.

In some embodiments, wherein the concentration of sucrose is 1-300 mmol/L, preferably 5-200 mmol/L, 10-100 mmol/L, 35-45 mmol/L, or about 40 mmol/L.

In some embodiments, wherein the concentration of mannitol is 10-300 mmol/L, preferably 10-200 mmol/L, 60-150 mmol/L, 85-125 mmol/L L, 90-120 mmol/L, or about 120 mmol/L, or about 90 mmol/L.

In some embodiments, the TACI-Fc fusion protein has an amino acid sequence as shown in SEQ ID NO. 1. The protein comprises amino acids 13-118 of TACI and an optimized Fc fragment that reduces ADCC and CDC effects.

In the TACI-Fc fusion protein shown in SEQ ID NO. 1, in order to avoid antibody-dependent cell-mediated toxicity (ADCC) effect generated by membrane-bound BLyS or a proliferation-inducing ligand (APRIL), the Fc fragment derived from IgG1 was sequenced optimized, wherein amino acids 120-123 in the CH2 region of the Fc fragment were mutated from leucine (L)-leucine (L)-glycine (G)-glycine (G) to alanine (A)-glutamic acid (E)-glycine (G)-alanine (A), to reduce the affinity of Fcγ receptors. In addition, the CH2 region of the Fc sequence was also mutated (amino acid residues 216~217 were mutated from alanine (A)-proline (P) to serine (S)-serine (S)) to reduce complement binding or fixation, thereby reducing complement-dependent cytotoxicity (CDC) effects.

The sequence of SEQ ID NO:1 is as follows:

```
001   SRVDQEERFP QGLWTGVAMR SCPEEQYWDP LLGTCMSCKT ICNHQSQRTC

051   AAFCRSLSCR KEQGKFYDHL LRDCISCASI CGQHPKQCAY FCENKLRSPV

101   NLPPELDKTH TCPPCPAPEA EGAPSVFLFP PKPKDTLMIS RTPEVTCVVV

151   DVSHEDPEVK FNWYVDGVEV HNAKTKPREE QYNSTYRVVS VLTVLHQDWL

201   NGKEYKCKVS NKALPSSIEK TISKAKGQPR EPQVYTLPPS RDELTKNQVS

251   LTCLVKGFYP SDIAVEWESN GQPENNYKTT PPVLDSDGSF FLYSKLTVDK

301   SRWQQGNVFS CSVMHEALHN HYTQKSLSLS PGK
```

In the liquid formulation, two TACI-Fc fusion protein monomers may form a double-stranded structure due to the formation of an interchain disulfide bond in Fc hinge region.

In some embodiments, wherein the concentration of the TACI-Fc fusion protein is 5-240 mg/ml, preferably about 50 mg/ml to about 100 mg/ml, and most preferably about 80 mg/ml to about 100 mg/ml.

In some embodiments, the non-reducing sugar is 90-120 mmol/L of mannitol and/or 35-45 mmol/L of sucrose, the amino acid is 75-125 mmol/L of arginine hydrochloride and/or 8-12 mmol/L of histidine hydrochloride, and the concentration of the TACI-Fc fusion protein is 80-100 mg/ml; and the concentration of the histidine hydrochloride is more preferably about 10 mmol/L.

In some embodiments, it comprises about 1% to about 10% (w/v, g/100 ml) of the TACI-Fc fusion protein, preferably about 6-10% (w/v, g/100 ml) of the TACI-Fc fusion protein.

In some embodiments, the non-reducing sugar is about 90 mmol/L of mannitol and about 40 mmol/L of sucrose, the amino acid is about 90 mmol/L of arginine hydrochloride and about 10 mmol/L of histidine hydrochloride, and the concentration of the TACI-Fc fusion protein is about 80 mg/ml.

In some embodiments, the non-reducing sugar is about 120 mmol/L of mannitol and about 40 mmol/L of sucrose, the amino acid is about 75 mmol/L of arginine hydrochloride and about 10 mmol/L of histidine hydrochloride, and the concentration of the TACI-Fc fusion protein is about 80 mg/ml.

In some embodiments, the formulation has a pH of 4.0 to 8.0, preferably 4.5 to 7.0, 5.0 to 6.0, or about 5.5. The pH value of the solution is adjusted by NaOH or hydrochloric acid.

In another aspect, the present disclosure relates to a lyophilized pharmaceutical formulation obtained by lyophilization of the aqueous liquid pharmaceutical formulation.

In some embodiments of the lyophilized pharmaceutical formulation, the aqueous liquid pharmaceutical formulation comprises about 90 mmol/L of mannitol, about 40 mmol/L of sucrose, about 90 mmol/L of arginine hydrochloride, about 10 mmol/L of histidine hydrochloride, and about 80 mg/ml of the TACI-Fc fusion protein, and the aqueous liquid pharmaceutical formulation has a pH of 5.0 to 6.0.

In some embodiments of the lyophilized pharmaceutical formulation, the aqueous liquid pharmaceutical formulation comprises about 120 mmol/L of mannitol, about 40 mmol/L of sucrose, about 75 mmol/L of arginine hydrochloride, about 10 mmol/L of histidine hydrochloride, and about 80 mg/ml of the TACI-Fc fusion protein, and the aqueous liquid pharmaceutical formulation has a pH of 5.0 to 6.0.

In some embodiments of the lyophilized pharmaceutical formulation, the non-reducing sugars in the aqueous liquid pharmaceutical formulation are mannitol and sucrose at concentrations of about 16.4 mg/ml and about 13.7 mg/ml, respectively; and the amino acids in the aqueous liquid pharmaceutical formulation are arginine hydrochloride and histidine hydrochloride at concentrations of about 19.0 mg/ml and about 2.1 mg/ml, respectively.

In some embodiments of the lyophilized pharmaceutical formulation, the non-reducing sugars in the aqueous liquid pharmaceutical formulation are mannitol and sucrose at concentrations of about 21.9 mg/ml and about 13.7 mg/ml, respectively; and the amino acids in the aqueous liquid pharmaceutical formulation are arginine hydrochloride and histidine hydrochloride at concentrations of about 15.8 mg/ml and about 2.1 mg/ml, respectively.

The present disclosure further relates to use of the pharmaceutical formulation in the manufacture of a medicament for the treatment of an autoimmune disease, and the autoimmune disease includes systemic lupus erythematosus, rheumatoid arthritis, neuromyelitis optica spectrum disorder (NMOSD), multiple sclerosis (MS) and Sjogren's syndrome, wherein the neuromyelitis optica spectrum disorder comprises neuromyelitis optica, recurrent optic neuritis, longitudinally extending transverse myelitis, optic-spinal form of multiple sclerosis, long-term transverse myelitis, unilateral or bilateral optic neuritis, optic neuritis or myelitis accompanying with autoimmune disease, optic neuritis or myelitis accompanying with symptomatic or asymptomatic intracranial lesions, and the lymphoma includes chronic lymphocytic leukemia, multiple myeloma and B lymphocyte lymphoma.

The present disclosure also relates to a method for preparing a TACI-Fc fusion protein pharmaceutical formulation, comprising: (1) preparing the formulation as described above; and (2) evaluating the stability of the TACI-Fc fusion protein in the formulation.

In another aspect, the present disclosure also relates to a method for preparing the pharmaceutical formulation as described above, comprising the following steps: obtaining the protein stock solution, pre-freezing, primary drying, secondary drying, and subpackaging.

In certain embodiments, the step of obtaining the protein stock solution includes:
1. Culturing genetically recombinant CHO cells capable of expressing the TACI-Fc fusion protein, and when the cell viability reaches an acceptable lower limit, separating the cells by centrifugation or filtration, and collecting the supernatant;
2. Performing a first step of purification using Protein A affinity chromatography column, and eluting the obtained target protein for ultrafiltration and concentration. Then performing a second step of purification on a composite packing chromatography column, and collecting the target protein peak. Finally, performing a third step of purification on the third column in a target protein penetration mode.

In certain embodiments, the step of obtaining the protein stock solution further includes: upon passing the test, the purified protein is mixed with "5× formulation buffer" for ultrafiltration and concentration to obtain the protein stock solution.

In certain embodiments, the obtained protein stock solution needs to be accurately diluted to the required protein concentration with a protein-free formulation buffer to obtain a semi-finished protein solution, which is then divided into vials for vacuum lyophilization. The main technical effect achieved by the present disclosure is that, the TACI-Fc protein after highly purified has a purity of more than 99% of non-reducing SDS-PAGE, and the CHO cell host protein, CHO cell host DNA, bacterial endotoxin and other indicators meet the requirements of "Chinese Pharmacopoeia" (2005 Edition) standard. The pharmaceutical formulation comprising the TACI-Fc fusion protein obtained in the present disclosure has reached excellent standards in terms of moisture content, number of particles, number of visible foreign matters and insoluble microparticles, and the pharmaceutical formulation has long-term storage stability.

DETAILED DESCRIPTION

Figure 1:
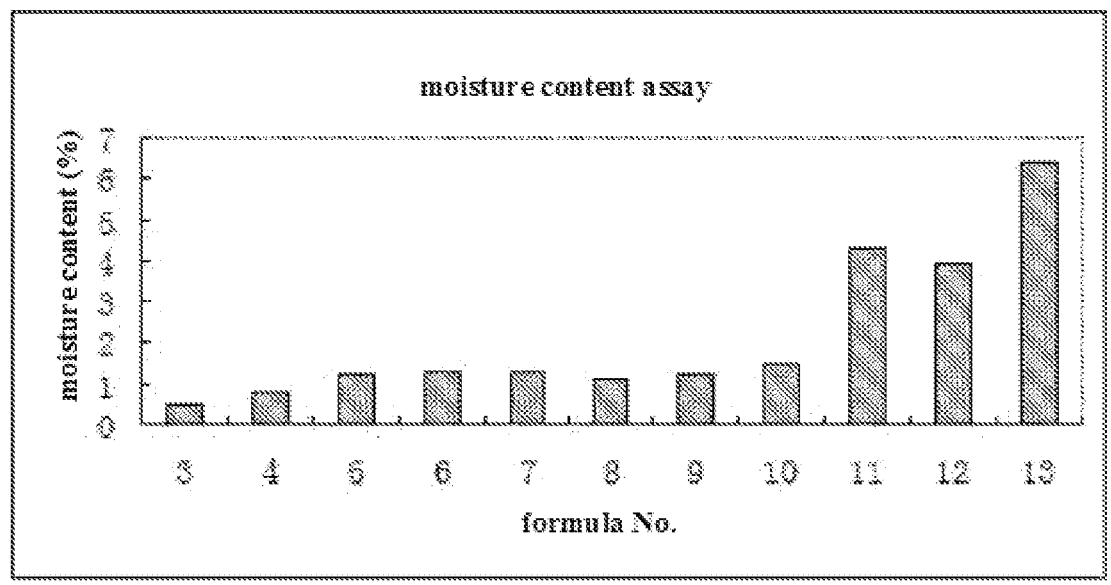
FIG. 1: Determination of moisture content. The results show that the lyophilized powders of formulas 11, 12, and 13 are very easy to absorb water, and the moisture content does not meet the requirements. Formulas 3 to 9 meet the requirements of moisture content test.
Figure 2:
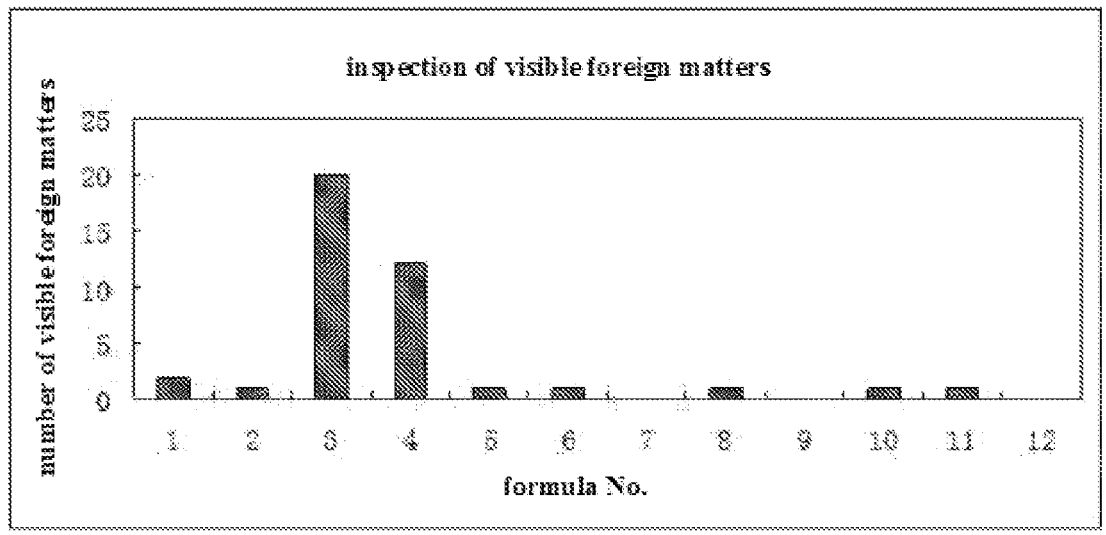
FIG. 2: Visible foreign matters inspection assay. The results show that formulas 3 and 4 do not meet the requirements of visible foreign matters test.
Figure 3:
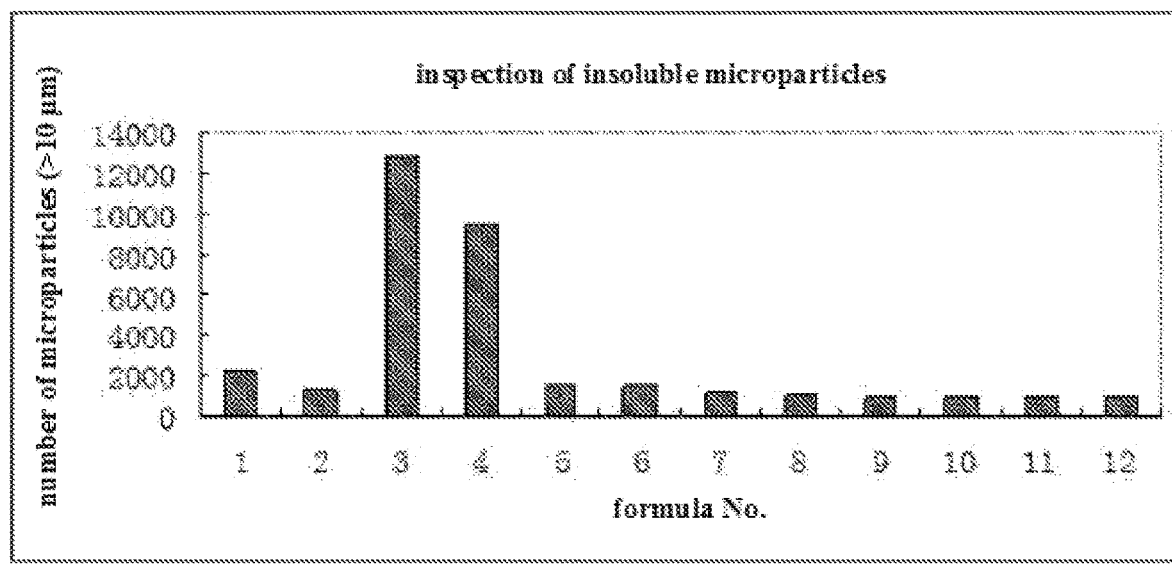
FIG. 3: Insoluble microparticles inspection assay. The results show that formulas 3 and 4 do not meet the requirements of insoluble microparticles inspection.

Example 1: Acquisition and Purification of TACI-Fc Fusion Protein

Total RNA was extracted from human peripheral blood mononuclear cells with Qiagen's RNA extraction kit. Then cDNA was synthesized from RNA by reverse transcriptase, before polymerase chain reaction was performed with the primers (Forward: AGCCGTGTGGACCAGGAGG (SEQ ID NO: 2); Reverse: GAGCTCTGGTGGAAGGTTCACTG (SEQ ID NO: 3) to amplify the desired TACI fragments. The immunoglobulin Fc fragment was obtained by PCR amplification from a cloned sequence-optimized IgG1 Fc plasmid with reduced ADCC and CDC effects. Finally, the TACI and Fe sequences were fused by PCR to construct a DNA sequence of the TACI-Fc fusion protein (its amino acid sequence is shown in SEQ ID NO. 1). Later, by using TA cloning kit, the PCR products of TACI and Fo were cloned into pCR2.1 plasmid respectively, which was then transfected into E. coli. After that, white colonies were picked and added with LB medium for overnight culture. Then the plasmid was extracted with Qiangen's plasmid extraction kit, and the TACI and Fe sequences were identified by restriction enzyme digestion and sequencing. Finally, TACI and IgG Fc cDNA were ligated together by the splicing PCR method. The TACI-Fe fragment was inserted into an expression plasmid. Subsequently, the recombinant plasmid was transfected into E. coli, then positive colonies were picked followed by plasmid extraction, and the target sequences were identified by restriction enzyme digestion and sequencing. Then the plasmid was transfected into CHO cells, and the genetically recombined CHO cells were cultured under standard conditions. When the nutrients in the medium were exhausted and the cells no longer grew, the culture mixture was collected. Then the cells were separated by centrifugation of filtration, and the supernatant containing TACI-Fc protein was collected and loaded onto Protein A affinity chromatography column for the first purification. The eluted target protein was then concentrated by ultrafiltration to a target protein concentration of 30-50 mg/ml and loaded onto a composite packing chromatography column for the second purification. The target protein was collected and then loaded onto the third column for the third purification in a target protein penetration mode. The purified protein that has passed the test on various indicators was mixed with "5× formulation buffer" in a volume ratio of 4:1 and then concentrated by ultrafiltration to obtain a protein at a concentration of about 100 mg/ml, which was the protein stock solution and could be stored at −80° C. for a long time.

Screening of Adjuvants

Through a large amount of information analysis and experimental screening in the early stage, sucrose, mannitol, glycerol, histidine, arginine, polysorbate 80 (i.e. Tween 80) and the like were preliminarily identified as candidate adjuvants for further screening, and the following tests were further carried out.

Example 2: Study on the Promotion of TACI-Fc Protein Dissolution by Arginine After overnight culture of TACI-Fc protein in arginine-free buffer (for example, 20 mmol/L $NaH_2PO_4$—$Na_2HPO_4$ 120 mmol/L NaCl, pH5.5) at a protein concentration of above 5 mg/ml in a 4° C. refrigerator, there will appear flocculent precipitate at the bottom of the container, and the inspection of visible foreign matters and insoluble microparticles cannot be performed due to the floating precipitate when shaken gently. The higher the protein concentration, the more serious the protein precipitates. Preliminary experimental studies show that adding arginine hydrochloride to the protein solution can make the precipitate disappear quickly.

Further experiments: 1) 7290 mg of purified TACI-Fc protein was dialyzed into 10 mmol/L of histidine (pH 5.5) buffer with a protein concentration of 5 mg/ml; 2) The protein solution was divided into 9 groups, 7 portions per group, 63 portions in total, with the protein content of 7 portions in each group of 10, 20, 40, 100, 160, 200, 300 mg respectively, and each of the 9 groups was added with 1 mol/L arginine hydrochloride (pH 5.5) solution until the final concentration of arginine hydrochloride was 0, 10, 20, 30, 40, 50, 75, 100, 125 mmol/L respectively, and then concentrated with a centrifugal ultrafiltration tube with a pore size of 30 KD to a final volume of 2 ml. Whether there was obvious precipitation of the protein was observed. If there was obvious precipitation, no further procedure would be required, and "−" was directly marked in the table. If the precipitation was not obvious, the protein solution would be filtered to a sterile 2 ml vial with a 0.22 μm sterile syringe filter in the super clean bench. Each vial was sealed with a sterile rubber stopper, put on an aluminum cap, and stored in a 4° C. refrigerator for 24 hours to observe whether there would be any precipitation.

Inspection standard: Observing under the YB-II clarity detector. Completely clear or no more than 3 white spots is marked as "−". If there is precipitation, it is marked as "+", "++" and "+++", according to the amount of precipitation. More "+" signs indicate more precipitation. The experimental results are shown in Table 1 that the optimal concentration of arginine hydrochloride is between 75 mmol/L and 125 mmol/L.

TABLE 1

The influence of the concentration of arginine hydrochloride on the solubility of TACI-Fc protein

| | | concentration of arginine hydrochloride (mmol/L) | | | | | | | |
|---|---|---|---|---|---|---|---|---|---|
| | | 0 | 10 | 20 | 30 | 40 | 50 | 75 | 100 | 125 |
| concentration of protein (mg/ml) | 5 | + | − | − | − | − | − | − | − | − |
| | 10 | ++ | − | − | − | − | − | − | − | − |
| | 20 | +++ | + | − | − | − | − | − | − | − |
| | 50 | − | ++ | + | − | − | − | − | − | − |
| | 80 | − | − | ++ | + | + | + | − | − | − |
| | 100 | − | − | − | ++ | ++ | ++ | − | − | − |
| | 150 | − | − | − | − | ++ | ++ | + | − | − |

Example 3: Determination of the Influence of Mannitol Concentration on the Moisture Content and Appearance of Lyophilized Powder Through the similar steps as in Example 2, the moisture content and appearance of the lyophilized powder prepared with different concentrations of TACI-Fc fusion protein in the presence of different concentrations of mannitol were investigated. Experiments show that when the mannitol content is less than 60 mmol/L, it will affect the moisture content and appearance of the lyophilized powder.

Example 4: The Effect of Sucrose on the Protective Effect of TACI-Fc Fusion Protein The stability of lyophilized powders of pharmaceutical formulations containing different concentrations of sucrose under the conditions of 4° C., 25° C. and 35° C. was investigated through experiments, which showed that when the concentration of sucrose in the lyophilized stock solution is lower than 10 mmol/L, the stock solution will lose the activity of the TACI-Fc fusion protein during lyophilization, and fail to play an effective lyophilization protective effect.

Example 5: Preparation of the Tentative Formulation Solution

On the basis of the above experiments, a variety of formulas of the formulation were designed for further investigation.

Preparation of Histidine Hydrochloride Solution:
According to the formulas in Table 2, 1× formulation buffers of formula No. 1-13 were prepared. Taking formula No. 1 in Table 2 as an example:
1) By calculating, weighing 2.10 g of histidine hydrochloride, 0 g of mannitol, 15.80 g of arginine hydrochloride, and 54.77 g of sucrose into a clean 1 L beaker;
2) Adding an appropriate amount of water for injection for dissolution, and adjusting the pH after dissolving;
3) Adjusting the volume according to the density of the solution by weighing method, and then fine-adjusting the pH to 5.5.

Other formulas were prepared according to the above steps according to the amount of each formula.

Preparation of dialysis buffer: 10 mmol/L of histidine hydrochloride, pH 5.5.

Preparation of Formulation Buffer:
1× formulation buffer: It was prepared according to the formula table of formulation buffer (Table 2);
5× formulation buffer: The formula is shown in Table 3, where the concentration of histidine hydrochloride was 10 mmol/L, the concentration of arginine hydrochloride was CArg×5 mmol/L, the concentration of mannitol was CMan×5 mmol/L and the concentration of sucrose was CSuc×5 mmol/L, with the pH fixed at 5.5. CArg, CMan and CSuc represent the concentration of arginine, mannitol and sucrose in the corresponding formula in 1× formulation buffer, respectively.

The pH value of the above solutions were all adjusted with 6 mol/L sodium hydroxide or 6 mol/L hydrochloric acid, and the solutions were used after ultrafiltration with an ultrafiltration membrane with a pore size not greater than 10 KD to remove endotoxins.

Formula Design Instructions:
1. Histidine hydrochloride is a pH buffering agent. According to the early experimental verification, 10 mmol/L was used as the concentration; and based on the above examples, it was determined that the minimum concentration of mannitol in each formula was 60 mmol/L, the minimum concentration of arginine hydrochloride was 75 mmol/L, and the minimum concentration of sucrose was 10 mmol/L.
2. Four concentrations of mannitol, arginine hydrochloride and sucrose each were combined. 60, 90, 120 and 150 mmol/L of mannitol, 75, 90, 105 and 120 mmol/L of arginine hydrochloride, and 10, 40, 70, 100 mmol/L of sucrose constituted 10 different combinations (formulas 4-13). Besides, formula 1 only contains arginine hydrochloride and mannitol, formula 2 only contains arginine hydrochloride, and formula 3 only contains arginine hydrochloride and sucrose.

TABLE 3

Formula table of 5× formulation buffer

| formula No. | histidine hydrochloride (mmol/L) | mannitol (mmol/L) | arginine hydrochloride (mmol/L) | sucrose (mmol/L) | pH |
|---|---|---|---|---|---|
| 1 | 10 | 0 | 375 | 800 | 5.5 |
| 2 | 10 | 0 | 800 | 0 | 5.5 |
| 3 | 10 | 800 | 375 | 0 | 5.5 |
| 4 | 10 | 750 | 375 | 50 | 5.5 |
| 5 | 10 | 600 | 450 | 50 | 5.5 |
| 6 | 10 | 450 | 525 | 50 | 5.5 |
| 7 | 10 | 300 | 600 | 50 | 5.5 |
| 8 | 10 | 600 | 375 | 200 | 5.5 |
| 9 | 10 | 450 | 450 | 200 | 5.5 |
| 10 | 10 | 300 | 525 | 200 | 5.5 |
| 11 | 10 | 450 | 375 | 350 | 5.5 |
| 12 | 10 | 300 | 450 | 350 | 5.5 |
| 13 | 10 | 300 | 375 | 500 | 5.5 |

Example 6: Vacuum Freeze Drying

The protein stock solution was taken out from the −80° C. refrigerator, thawed, diluted accurately with "1× formulation buffer" to a protein concentration of 80 mg/ml, and sub-packaged into a sterile, pyrogen-free standard 20 ml lyophilized vial, 1 ml per vial, and then subjected to freeze drying in vacuum.

TABLE 2

Formula table of 1× formulation buffer

| Formula number | Histidine Hydrochloride (mmol/L) | Mannitol (mmol/L) | Arginine Hydrochloride (mmol/L) | Sucrose (mmol/L) | pH | Osmotic pressure (mOsm/L) |
|---|---|---|---|---|---|---|
| 1 | 10 | 0 | 75 | 160 | 5.5 | 330 |
| 2 | 10 | 0 | 160 | 0 | 5.5 | 330 |
| 3 | 10 | 160 | 75 | 0 | 5.5 | 330 |
| 4 | 10 | 150 | 75 | 10 | 5.5 | 330 |
| 5 | 10 | 120 | 90 | 10 | 5.5 | 330 |
| 6 | 10 | 90 | 105 | 10 | 5.5 | 330 |
| 7 | 10 | 60 | 120 | 10 | 5.5 | 330 |
| 8 | 10 | 120 | 75 | 40 | 5.5 | 330 |
| 9 | 10 | 90 | 90 | 40 | 5.5 | 330 |
| 10 | 10 | 60 | 105 | 40 | 5.5 | 330 |
| 11 | 10 | 90 | 75 | 70 | 5.5 | 330 |
| 12 | 10 | 60 | 90 | 70 | 5.5 | 330 |
| 13 | 10 | 60 | 75 | 100 | 5.5 | 330 |

Freeze Drying Conditions
  Pre-freezing: −45° C. for 5 hours;
  Primary drying: −26° C. for 40 hours, at vacuum degree of 10-15 Pa; and
  Secondary drying: 25° C. for 10 hours, at vacuum degree of 10-15 Pa.
After lyophilization, the vials were sealed with a rubber stopper in a vacuum state, taken out of the lyophilizer and put on an aluminum cap.

Example 7: Inspection of the Appearance and Moisture Content of the Lyophilized Powder Acceptance standards for the appearance of lyophilized powders are: uniform color, even and dense pores, and the volume and shape before and after lyophilization remain basically unchanged, showing a block or spongy mass structure.

TABLE 4

Appearance observation of lyophilized powder

| formula No. | histidine hydrochloride (mmol/L) | mannitol (mmol/L) | arginine hydrochloride (mmol/L) | sucrose (mmol/L) | appearance * |
|---|---|---|---|---|---|
| 1 | 10 | 0 | 75 | 160 | −− |
| 2 | 10 | 0 | 160 | 0 | − |
| 3 | 10 | 160 | 75 | 0 | ++ |
| 4 | 10 | 150 | 75 | 10 | ++ |
| 5 | 10 | 120 | 90 | 10 | ++ |
| 6 | 10 | 90 | 105 | 10 | + |
| 7 | 10 | 60 | 120 | 10 | + |
| 8 | 10 | 120 | 75 | 40 | ++ |
| 9 | 10 | 90 | 90 | 40 | ++ |
| 10 | 10 | 60 | 105 | 40 | − |
| 11 | 10 | 90 | 75 | 70 | + |
| 12 | 10 | 60 | 90 | 70 | + |
| 13 | 10 | 60 | 75 | 100 | − |

Note:
"−−" indicates that the volume of the mass was reduced to less than half of its volume before lyophilization;
"−" indicates that the volume of the mass was reduced to more than half of its volume before lyophilization;
"+" indicates that only the edge portion had slight shrinkage, and the volume of the mass was basically the same as that of before lyophilization; and "++" indicates that there was no volume shrinkage at all, and the volume of the product was the same as before lyophilization.

The experimental results are shown in Table 4 that the appearance of the lyophilized powder of formula 1, formula 2, formula 10 and formula 13 does not meet the requirements and is eliminated. The appearance of lyophilized powder of other formulas meets the requirements.

Test Standard for Moisture Content Assay:

The moisture content of the lyophilized powder was measured by SF-6 type micro-moisture analyzer (Karl Fischer Coulometric Method), and the acceptance standard is not more than 3%.

TABLE 5 results of moisture content measurement

| formula No. | histidine (mmol/L) | mannitol (mmol/L) | arginine (mmol/L) | sucrose (mmol/L) | moisture content (%) |
|---|---|---|---|---|---|
| 3 | 10 | 160 | 75 | 0 | 0.5 |
| 4 | 10 | 150 | 75 | 10 | 0.8 |
| 5 | 10 | 120 | 90 | 10 | 1.2 |
| 6 | 10 | 90 | 105 | 10 | 1.3 |
| 7 | 10 | 60 | 120 | 10 | 1.3 |
| 8 | 10 | 120 | 75 | 40 | 1.1 |
| 9 | 10 | 90 | 90 | 40 | 1.2 |
| 11 | 10 | 90 | 75 | 70 | 4.3 |
| 12 | 10 | 60 | 90 | 70 | 3.9 |
| 13 | 10 | 60 | 75 | 100 | 6.4 |

The experimental results show that the lyophilized powders of formulas 11, 12, and 13 are very easy to absorb water, and the moisture content does not meet the requirements. Formulas 3-9 meet the requirements of the moisture content test.

Example 8: Inspection of Visible Foreign Matters and Insoluble Microparticles

The lyophilized powder was redissoluted with sterile water for injection, each with a volume of 1 ml. Before redissolution, it was relieved from the vacuum, and then the water was slowly added along the inner wall of the vial.

YB-II clarity detector was used for visible foreign matters inspection. In accordance with "Visible Foreign Matters Inspection Method-Lamp Inspection Method" in "Chinese Pharmacopoeia" (2005 Edition) Appendix VB and the relevant provisions of "Notice on Issuing the Supplementary Provisions of the Visible Foreign Matters Inspection Method" by National Food and Drug Administration [National Food and Drug Administration Registration [2005] No. 37], 20 vials were inspected for each formula, and the average content of visible foreign matters in each vial was calculated.

Acceptance standards for visible foreign matters inspection: Among the 5 test samples (vials) inspected, no foreign matter such as glass shards, fibers, color spots, color blocks shall be detected, and no more than 3 other visible foreign matters (white spots, fine protein floccules or protein particles) shall be detected.

The inspection of insoluble microparticles was carried out using ZWJ-3 insoluble microparticle detector. In accordance with "Insoluble Microparticle Inspection Method-Photoresistance Method" in "Chinese Pharmacopoeia" (2005 Edition) Appendix IXC, the number of insoluble microparticles above 10 microns and above 25 microns in each milliliter of protein solution was examined. 3 vials were inspected for each formula, and the average content of insoluble microparticles in each vial was calculated.

Acceptance standards for insoluble microparticles inspection: each test container shall contain no more than 6,000 microparticles equal to or above 10 µm and no more than 600 microparticles equal to or above 25 µm.

TABLE 6

Inspection results of visible foreign matters and insoluble microparticles

| formula No. | histidine (mmol/L) | mannitol (mmol/L) | arginine (mmol/L) | sucrose (mmol/L) | number of visible foreign matters | number of insoluble microparticles (>10 µm) | number of insoluble microparticles (>25 µm) |
|---|---|---|---|---|---|---|---|
| 1 | 10 | 0 | 75 | 160 | 2 | 2263 | 273 |
| 2 | 10 | 0 | 160 | 0 | 1 | 1252 | 178 |
| 3 | 10 | 160 | 75 | 0 | 20 | 12845 | 1294 |
| 4 | 10 | 150 | 75 | 10 | 12 | 9578 | 985 |
| 5 | 10 | 120 | 90 | 10 | 1 | 1574 | 109 |
| 6 | 10 | 90 | 105 | 10 | 1 | 1483 | 193 |
| 7 | 10 | 60 | 120 | 10 | 0 | 1206 | 143 |
| 8 | 10 | 120 | 75 | 40 | 1 | 1012 | 129 |
| 9 | 10 | 90 | 90 | 40 | 0 | 985 | 116 |
| 10 | 10 | 60 | 105 | 40 | 1 | 939 | 98 |
| 11 | 10 | 90 | 75 | 70 | 1 | 895 | 129 |
| 12 | 10 | 60 | 90 | 70 | 0 | 902 | 137 |
| 13 | 10 | 60 | 75 | 100 | 2 | 1594 | 201 |

According to the data obtained in Table 6, it can be seen that formulas 3 and 4 do not meet the requirements for inspection of visible foreign matters and insoluble microparticles.

Example 9. Long-Term (1-12 Months) Stability Investigation of Lyophilized Powder Formulas 1, 2, 10, and 13 were eliminated due to the appearance inspection of lyophilized powder, formulas 11 and 12 were eliminated due to the moisture content inspection, and formulas 3 and 4 were eliminated due to the inspection of visible foreign matters and insoluble microparticles. Stability investigation was performed on the remaining formulas 5, 6, 7, 8, and 9. The lyophilized powder of each formula was stored at 37° C., 25° C. and 4° C. respectively, and was sampled at different times for inspections such as SDS-PAGE, reverse phase HPLC, biological activity by ligand binding method, moisture content, appearance, pH, visible foreign matters and insoluble microparticles. The results are shown in Tables 7, 8, and 9.

The results show that the formula with a sucrose concentration of 10 mmol/L had poor stability, and the formula 8 and formula 9 with a sucrose concentration of 40 mmol/L had better long-term storage stability. In all aspects, formulas 8-9 meet the requirements in terms of moisture content, visible foreign matters, appearance, insoluble microparticles, and stability.

TABLE 7

Results of stability investigation after storage at 37° C. for 1 month

| formula No. | non-reducing SDS-PAGE (%) | reducing SDS-PAGE (%) | reverse phase HPLC (%) | activity (×105 U/mg) | moisture content (%) | appearance | number of visible foreign matters | pH | insoluble microparticles (>10 μm) | insoluble microparticles (>25 μm) |
|---|---|---|---|---|---|---|---|---|---|---|
| 5 | 97 | 94 | 92 | 2.8 | 1.5 | ++ | 1 | 5.5 | 928 | 149 |
| 6 | 97 | 94 | 92 | 2.9 | 1.4 | ++ | 0 | 5.5 | 1029 | 192 |
| 7 | 97 | 94 | 92 | 2.5 | 1.9 | ++ | 1 | 5.5 | 1320 | 103 |
| 8 | 97 | 94 | 97 | 3.9 | 1.9 | ++ | 1 | 5.5 | 992 | 98 |
| 9 | 97 | 97 | 97 | 4.2 | 1.7 | ++ | 0 | 5.5 | 1302 | 136 |

TABLE 8

Results of stability investigation after storage at 25° C. for 3 months

| formula No. | non-reducing SDS-PAGE (%) | reducing SDS-PAGE (%) | reverse phase HPLC (%) | activity (×105 U/mg) | moisture content (%) | appearance | number of visible foreign matters | pH | insoluble microparticles (>10 μm) | insoluble microparticles (>25 μm) |
|---|---|---|---|---|---|---|---|---|---|---|
| 5 | 97 | 93 | 92 | 2.8 | 1.3 | ++ | 0 | 5.5 | 1785 | 210 |
| 6 | 97 | 93 | 92 | 2.9 | 1.6 | ++ | 0 | 5.5 | 1649 | 191 |
| 7 | 97 | 93 | 92 | 2.5 | 1.9 | ++ | 1 | 5.5 | 989 | 189 |
| 8 | 97 | 97 | 97 | 3.5 | 1.8 | ++ | 1 | 5.5 | 1029 | 164 |
| 9 | 97 | 97 | 97 | 3.8 | 1.6 | ++ | 0 | 5.5 | 1258 | 212 |

TABLE 9

Results of stability investigation after storage at 4° C. for 12 months

| formula No. | non-reducing SDS-PAGE (%) | reducing SDS-PAGE (%) | reverse phase HPLC (%) | activity (×105 U/mg) | moisture content (%) | appearance | number of visible foreign matters | pH | insoluble microparticles (>10 μm) | insoluble microparticles (>25 μm) |
|---|---|---|---|---|---|---|---|---|---|---|
| 5 | 97 | 92 | 93 | 2.1 | 1.8 | ++ | 0 | 5.5 | 1398 | 206 |
| 6 | 97 | 92 | 93 | 1.9 | 1.6 | ++ | 0 | 5.5 | 1933 | 196 |
| 7 | 97 | 92 | 93 | 2.6 | 1.8 | ++ | 0 | 5.5 | 1578 | 156 |
| 8 | 97 | 97 | 97 | 3.6 | 1.3 | ++ | 1 | 5.5 | 1765 | 168 |
| 9 | 97 | 97 | 97 | 4.1 | 1.6 | ++ | 1 | 5.5 | 1947 | 239 |

Based on the above experimental data, it can be seen that on the one hand, the choice of specific adjuvants in a class of substances such as non-reducing sugars and amino acids has an unpredictable effect on the final formulation. For the fusion protein of the present disclosure, a large number of experiments are needed to test various properties in order to finally obtain a good combination of components. For example, according to experimental evidence, although formulas 1-13 all contain histidine hydrochloride, mannitol, arginine hydrochloride and sucrose, due to the difference in the content of these components, the final inspection results of moisture content, visible foreign matters, appearance, insoluble microparticles and stability varied considerably, and only formulas 8 and 9 succeeded to pass the above tests. As such, the choice of the types and contents of the adjuvant components of pharmaceutical formulations is of critical significance and the predictability is poor.

On the other hand, on account of the heterogeneous structure of antibodies, especially the complementarity determining regions (CDRs) and Fc glycosylation, the development of different monoclonal antibody formulations needs to be carried out individually based on case. In the development of antibody formulations, there are challenges in antibody conformation, colloid or chemical structure, such as oxidation, isomerization, deamidation, aggregation, denaturation and fragmentation. Based on the above information, it can be seen that the formulation components of previously marketed antibody drugs and fusion proteins have their own uniqueness. When those skilled in the art are faced with the choice of adjuvants for antibody drugs, the explicit teachings obtained from the products of the prior art are not indicative enough and still need a large number of tests to determine the appropriate formulation protocols. Based on abundant and long-term experimental research, the present disclosure has obtained a composition suitable for TACI-Fc fusion protein formulations, which dissolve well before and after lyophilization, with the insoluble microparticles and visible foreign matters meeting the standards of injection for human use, and yet remain stable for a long time during the lyophilization and storage process, even when placed under high temperature conditions of 25° C. or 37° C. for a long time. The lyophilized formulation was not prone to polymerization or degradation after redissolution, maintained good biological activity, and achieved unexpected technical effects.

The invention claimed is:

1. An aqueous liquid pharmaceutical formulation of Transmembrane Activator and CAML-interactor-FC (TACI-Fc) fusion protein, comprising TACI-Fc fusion protein, a non-reducing sugar, and an amino acid; wherein the non-reducing sugar is selected from mannitol, sucrose, trehalose and a combination thereof; and the amino acid is selected from histidine, alanine, arginine, glycine, glutamic acid and a combination thereof, wherein the TACI-Fc fusion protein has the amino acid sequence as shown in SEQ ID NO: 1.

2. The aqueous liquid pharmaceutical formulation according to claim 1, wherein the histidine is histidine hydrochloride at a concentration of 1-100 mmol/L; and the arginine is arginine hydrochloride at a concentration of 10-160 mmol/L.

3. The aqueous liquid pharmaceutical formulation according to claim 1, wherein the concentration of the sucrose is 1-300 mmol/L.

4. The aqueous liquid pharmaceutical formulation according to claim 1, wherein the concentration of the mannitol is 10-300 mmol/L.

5. The aqueous liquid pharmaceutical formulation according to claim 1, wherein the concentration of TACI-Fc fusion protein is 5-240 mg/ml.

6. The aqueous liquid pharmaceutical formulation according to claim 5, wherein the non-reducing sugar is 90-120 mmol/L of mannitol and/or 35-45 mmol/L of sucrose, the amino acid is 75-125 mmol/L of arginine hydrochloride and/or 8-12 mmol/L of histidine hydrochloride, and the concentration of TACI-Fc fusion protein is 80-100 mg/ml; and the concentration of histidine hydrochloride is about 10 mmol/L.

7. The aqueous liquid pharmaceutical formulation according to claim 1, comprising about 1% to about 10% (w/v, g/100 ml) of TACI-Fc fusion protein.

8. The aqueous liquid pharmaceutical formulation according to claim 6, wherein the non-reducing sugar is about 90 mmol/L of mannitol and about 40 mmol/L of sucrose, the amino acid is about 90 mmol/L of arginine hydrochloride and about 10 mmol/L of histidine hydrochloride, and the concentration of TACI-Fc fusion protein is about 80 mg/ml.

9. The aqueous liquid pharmaceutical formulation according to claim 6, wherein the non-reducing sugar is about 120 mmol/L of mannitol and about 40 mmol/L of sucrose, the amino acid is about 75 mmol/L of arginine hydrochloride and about 10 mmol/L of histidine hydrochloride, and the concentration of TACI-Fc fusion protein is about 80 mg/ml.

10. The aqueous liquid pharmaceutical formulation according to claim 1, wherein the formulation has a pH of 4.0 to 8.0.

11. The aqueous liquid pharmaceutical formulation according to claim 1, wherein two of the TACI-Fc fusion proteins in the aqueous liquid pharmaceutical formulation form a double-stranded structure via a linking disulfide bond formed in Fc hinge region.

12. A lyophilized pharmaceutical formulation obtained by lyophilization of the aqueous liquid pharmaceutical formulation according to claim 1.

13. The lyophilized pharmaceutical formulation according to claim 12, wherein the aqueous liquid pharmaceutical formulation comprises about 90 mmol/L of mannitol, about 40 mmol/L of sucrose, about 90 mmol/L of arginine hydrochloride, about 10 mmol/L of histidine hydrochloride, and about 80 mg/ml of TACI-Fc fusion protein, and has a pH of 5.0 to 6.0.

14. The lyophilized pharmaceutical formulation according to claim 12, wherein the aqueous liquid pharmaceutical formulation comprises about 120 mmol/L of mannitol, about 40 mmol/L of sucrose, about 75 mmol/L of arginine hydrochloride, about 10 mmol/L of histidine hydrochloride, and about 80 mg/ml of TACI-Fc fusion protein, and has a pH of 5.0 to 6.0.

15. The lyophilized pharmaceutical formulation according to claim 12, wherein the non-reducing sugars in the aqueous liquid pharmaceutical formulation are mannitol and sucrose at concentrations of about 16.4 mg/ml and about 13.7 mg/ml, respectively; and the amino acids in the aqueous liquid pharmaceutical formulation are arginine hydrochloride and histidine hydrochloride at concentrations of about 19.0 mg/ml and about 2.1 mg/ml, respectively.

16. The lyophilized pharmaceutical formulation according to claim 12, wherein the non-reducing sugars in the aqueous liquid pharmaceutical formulation are mannitol and sucrose at concentrations of about 21.9 mg/ml and about 13.7 mg/ml, respectively; and the amino acids in the aqueous liquid pharmaceutical formulation are arginine hydrochloride and histidine hydrochloride at concentrations of about 15.8 mg/ml and about 2.1 mg/ml, respectively.

17. A method of treating an autoimmune disease comprising administering the aqueous liquid pharmaceutical formulation according to claim 1 to a subject in need thereof, wherein the autoimmune disease is selected from the group consisting of systemic lupus erythematosus, rheumatoid arthritis, neuromyelitis optica spectrum disorder (NMOSD), multiple sclerosis (MS), Sjogren's syndrome, neuromyelitis optica, recurrent optic neuritis, longitudinally extending transverse myelitis, optic-spinal form of multiple sclerosis, long-term transverse myelitis, unilateral or bilateral optic neuritis, optic neuritis or myelitis accompanying with autoimmune disease, and optic neuritis or myelitis accompanying with symptomatic or asymptomatic intracranial lesions.

18. A method of treating a lymphoma comprising administering the aqueous liquid pharmaceutical formulation according to claim 1 to a subject in need thereof, wherein the lymphoma is selected from the group consisting of chronic lymphocytic leukemia, multiple myeloma and B lymphocyte lymphoma.

19. A method for preparing a TACI-Fc fusion protein pharmaceutical formulation, comprising: (1) preparing the formulation according to claim 1; and (2) evaluating the stability of TACI-Fc fusion protein in the formulation.

* * * * *

SEQUENCE LISTING

<160> NUMBER OF SEQ ID NOS: 3

<210> SEQ ID NO 1
<211> LENGTH: 333
<212> TYPE: PRT
<213> ORGANISM: Artificial Sequence
<220> FEATURE:
<223> OTHER INFORMATION: RC18 amino acid sequence

<400> SEQUENCE: 1

Ser Arg Val Asp Gln Glu Glu Arg Phe Pro Gln Gly Leu Trp Thr Gly
1               5                   10                  15

Val Ala Met Arg Ser Cys Pro Glu Glu Gln Tyr Trp Asp Pro Leu Leu
            20                  25                  30

Gly Thr Cys Met Ser Cys Lys Thr Ile Cys Asn His Gln Ser Gln Arg
        35                  40                  45

Thr Cys Ala Ala Phe Cys Arg Ser Leu Ser Cys Arg Lys Glu Gln Gly
    50                  55                  60

Lys Phe Tyr Asp His Leu Leu Arg Asp Cys Ile Ser Cys Ala Ser Ile
65                  70                  75                  80

Cys Gly Gln His Pro Lys Gln Cys Ala Tyr Phe Cys Glu Asn Lys Leu
                85                  90                  95

Arg Ser Pro Val Asn Leu Pro Pro Glu Leu Asp Lys Thr His Thr Cys
            100                 105                 110

Pro Pro Cys Pro Ala Pro Glu Ala Glu Gly Ala Pro Ser Val Phe Leu
        115                 120                 125

Phe Pro Pro Lys Pro Lys Asp Thr Leu Met Ile Ser Arg Thr Pro Glu
    130                 135                 140

Val Thr Cys Val Val Val Asp Val Ser His Glu Asp Pro Glu Val Lys
145                 150                 155                 160

Phe Asn Trp Tyr Val Asp Gly Val Glu Val His Asn Ala Lys Thr Lys
                165                 170                 175

Pro Arg Glu Glu Gln Tyr Asn Ser Thr Tyr Arg Val Val Ser Val Leu
            180                 185                 190

Thr Val Leu His Gln Asp Trp Leu Asn Gly Lys Glu Tyr Lys Cys Lys
        195                 200                 205

Val Ser Asn Lys Ala Leu Pro Ser Ser Ile Glu Lys Thr Ile Ser Lys
    210                 215                 220

Ala Lys Gly Gln Pro Arg Glu Pro Gln Val Tyr Thr Leu Pro Pro Ser
225                 230                 235                 240

Arg Asp Glu Leu Thr Lys Asn Gln Val Ser Leu Thr Cys Leu Val Lys
                245                 250                 255

Gly Phe Tyr Pro Ser Asp Ile Ala Val Glu Trp Glu Ser Asn Gly Gln
            260                 265                 270

Pro Glu Asn Asn Tyr Lys Thr Thr Pro Pro Val Leu Asp Ser Asp Gly
        275                 280                 285

Ser Phe Phe Leu Tyr Ser Lys Leu Thr Val Asp Lys Ser Arg Trp Gln
    290                 295                 300

Gln Gly Asn Val Phe Ser Cys Ser Val Met His Glu Ala Leu His Asn
305                 310                 315                 320

His Tyr Thr Gln Lys Ser Leu Ser Leu Ser Pro Gly Lys
                325                 330

<210> SEQ ID NO 2
<211> LENGTH: 19
<212> TYPE: DNA

```
<213> ORGANISM: Artificial Sequence
<220> FEATURE:
<223> OTHER INFORMATION: Forward Primer

<400> SEQUENCE: 2
agccgtgtgg accaggagg                                                       19

<210> SEQ ID NO 3
<211> LENGTH: 23
<212> TYPE: DNA
<213> ORGANISM: Artificial Sequence
<220> FEATURE:
<223> OTHER INFORMATION: Reverse Primer

<400> SEQUENCE: 3
gagctctggt ggaaggttca ctg                                                  23
```